March 12, 1968 — C. G. WEARDEN ET AL — 3,372,623
BRAKE OPERATOR MECHANICAL RELEASE
Filed Jan. 19, 1966 — 2 Sheets-Sheet 1

INVENTORS.
Charles G. Wearden
Robert H. Kline
BY
ATTORNEYS.

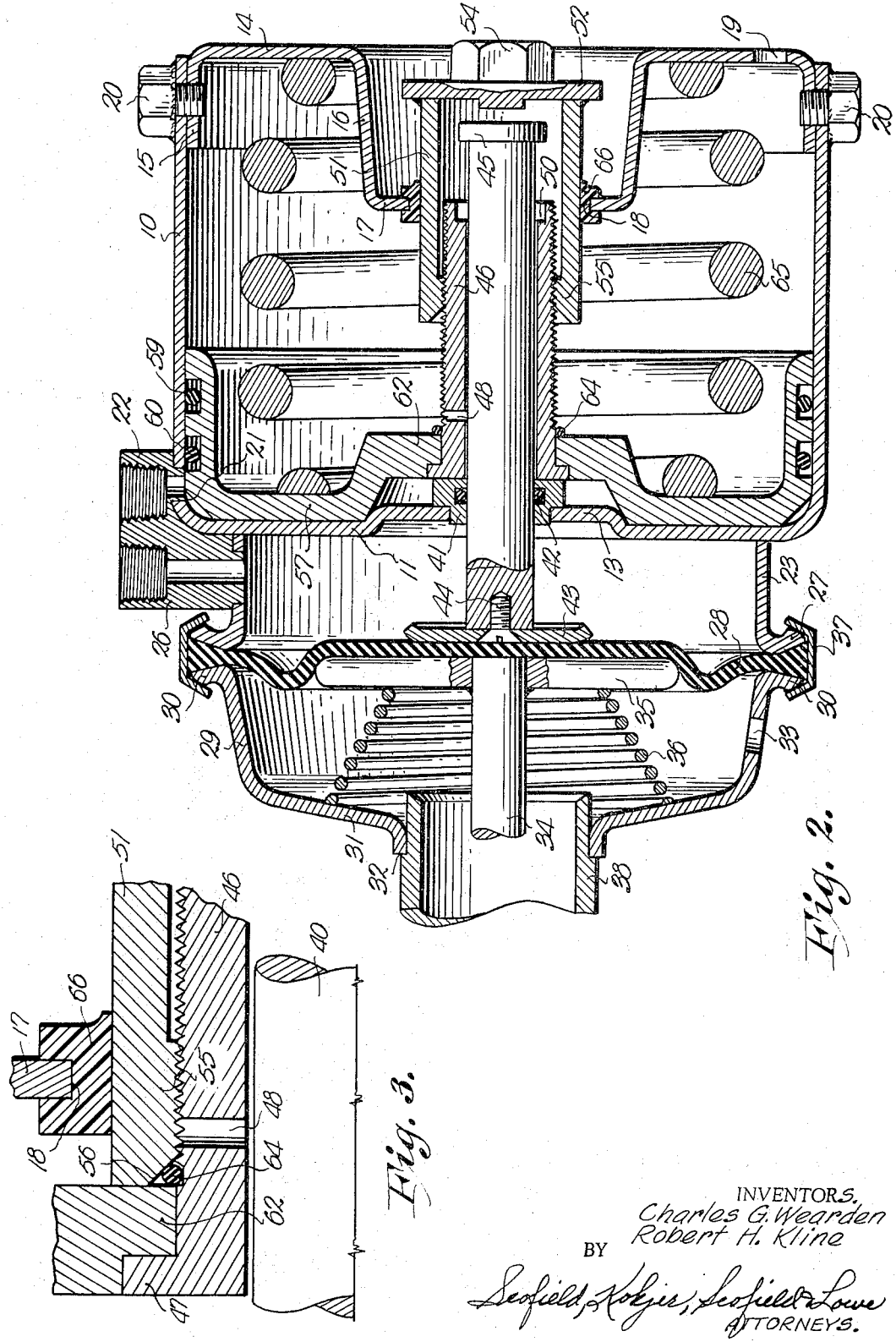

United States Patent Office 3,372,623
Patented Mar. 12, 1968

3,372,623
BRAKE OPERATOR MECHANICAL RELEASE
Charles G. Wearden, Prairie Village, Kans., and Robert H. Kline, Cherry Hill, N.J., assignors, by mesne assignments, to Certain-Teed Products Corporation, Ardmore, Pa., a corporation of Maryland
Filed Jan. 19, 1966, Ser. No. 521,673
6 Claims. (Cl. 92—63)

ABSTRACT OF THE DISCLOSURE

A spring emergency and parking brake of the "add-on" or "piggy-back" type—that is, the power spring chamber outboard of the service chamber with respect to the brake, per se, and a mechanical release for said brake comprising means for decoupling the brake from the expanded power spring, said means also providing fluid recompression of the power spring until the same is restored to its original condition.

---

This invention relates to fluid pressure operated vehicle braking systems and refers more particularly to such systems which include spring means for applying the brakes under emergency and parking conditions, the invention being particularly concerned with improved means for releasing the brakes after they have become applied automatically as the result of loss of fluid pressure normally associated with their use.

The general intent of all spring brakes is to provide a means of applying the foundation service brakes on one or more axles of a vehicle when same has lost its normal air pressure required to operate the service brake chamber. Under these conditions, it is considered operating as an emergency brake. When the air pressure that is introduced to the spring mechanism aid chamber is controlled by the driver and only exhausted after a vehicle is brought to a stop with its service brakes, then it is considered a parking brake.

The following statements only pertain to "add-on" units. These are basically spring brake chambers that are attached through a portion of the existing service brake chamber that is already mounted on the vehicle. The "add-on" type transfers the spring force through a sealed common inner wall to the pressure side of the normal service brake diaphragm, then through the brake application rod, whether it is a cam or a wedge brake mechanism.

Many previously designed "add-on" brake actuators have had some type of threaded mechanism to permit either the compressing or the relaxing of the spring for either installing convenience or releasing the spring force that would be applying the brakes and preventing the vehicle from being moved. All of these so-called releasing mechanisms, anti-explosion devices, etc. have been of such construction that they could be partially adjusted to release the spring action after a failure within themselves or the service brake system. In a case of this type, if the releasing mechanism was not returned to its normal position, the device would either interfere with its own function or the normal function of the service brakes.

Also, in all previously designed "add-on" chambers, the construction of the releasing mechanism and its attachment to the movable piston have been of such nature that the forward motion of the piston, produced by the spring, could cause a binding action within the mechanism and greatly reduce the force being transferred to the brake applying rod and in some cases, completely prevent it.

In the instant design, we have incorporated entirely new concepts of releasing the spring action. Further, we have provided a design that is such that it will immediately indicate to the mechanic or the person tampering with its adjustment that it has not been returned to its normal position.

An object of the instant invention is to provide an improved "add-on" type emergency and parking brake system particularly incorporating an improved mechanical release for the spring brake.

Another object of the invention is to provide an improved "add-on" type emergency and parking brake actuating mechanism which can be economically manufactured, is sturdy in construction, easy to assemble and install and has new and improved features of construction, arrangement and operation.

Another object of the invention is to provide an improved mechanical release construction for a spring emergency brake of the "add-on" type which is so constructed and arranged as to eliminate the objections and failure hazards heretofore present in similar units.

Another object of the invention is to provide a mechanical release construction for an "add-on" type emergency brake construction wherein, once the mechanical release device has been employed, the emergency spring cannot be recompressed by air pressure until the mechanical release means has been returned to its base or normal position.

Another object of the invention is to provide a mechanical release device for an "add-on" type emergency and parking brake for vehicles wherein the spring emergency brake may be released to a greater or lesser extent as desired by the operator, once said spring has been set.

Other and further objects of the invention will appear in the course of the following description thereof.

In the drawings, which form a part of the instant specification and are to be read in conjunction therewith, an embodiment of the instant invention is shown and, in the various views, like numerals are employed to indicate like parts.

FIG. 2 is a view like that of FIG. 1, but with the power spring of the emergency chamber expanded and pressurization absent from said chamber or being bled off through release means to be discussed. The mechanical release is shown in partly released position.

FIG. 3 is an enlarged fragmentary detail of the juncture of the back-off tube and piston hub of the previous two figures.

Figure 1:
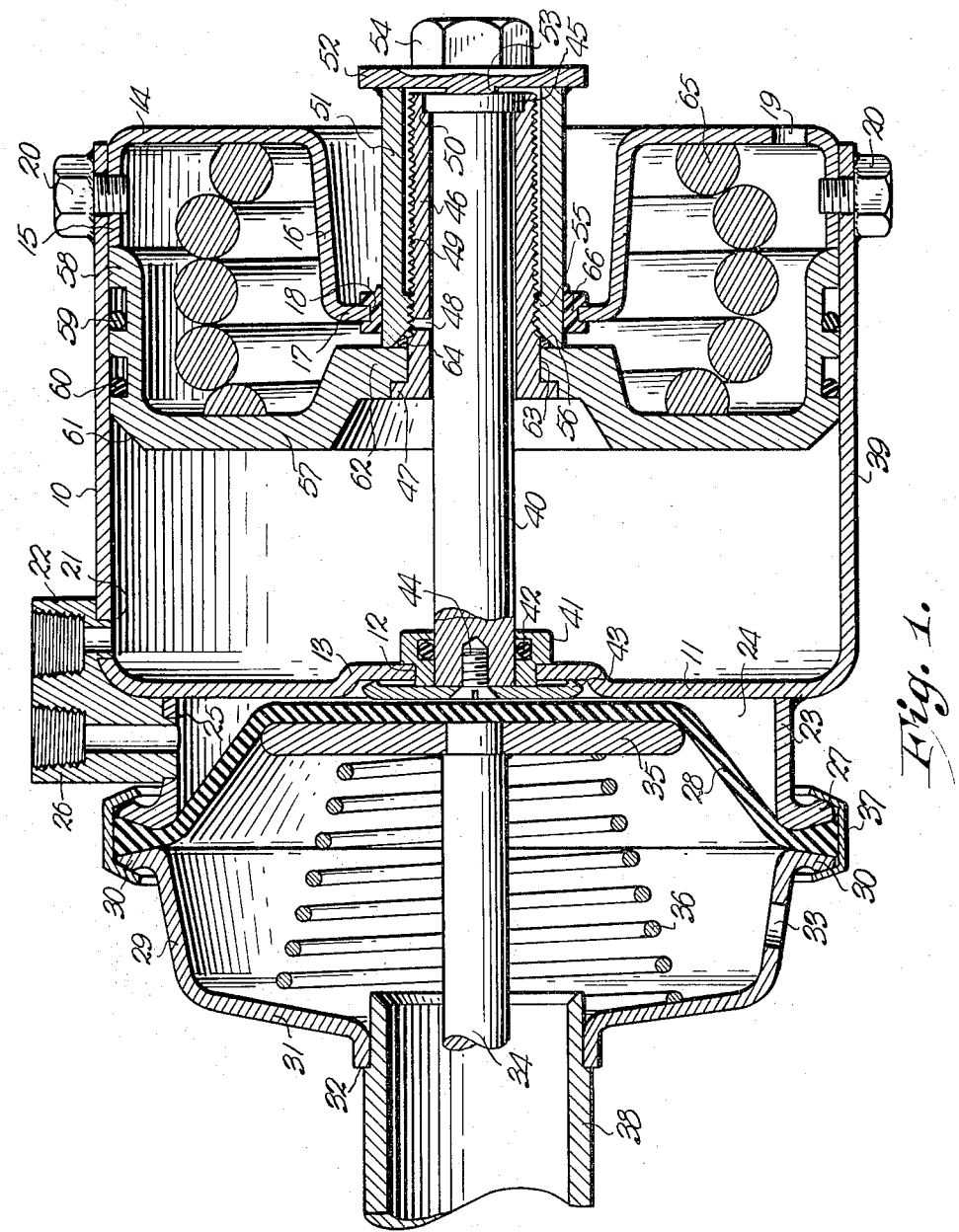
FIG. 1 is a side-sectional view through an "add-on" type emergency and parking brake construction, showing both service and emergency chambers, the emergency chamber shown under pressurization with the power spring thereof compressed.

Referring to the drawings, at 10 is seen the cylindrical side wall of a spring brake cylinder. The inward (toward the vehicle brake assembly) end of wall 10 comprises interwall 11 having central opening 12 therethrough in slightly outwardly formed portion 13 thereof. At 14 is seen the outermost wall portion of a removable cylinder head and spring support, same having peripheral inwardly extending flange 15 and a central inwardly extending recess formed by wall portion 16. Wall 16 has central opening 17 at the inward end thereof with opening 18 therethrough. Breather or vent opening 19 is formed through a peripheral portion of wall 14. Suitable matching openings are provided through side wall 10 and flange 15 to receive self-locking cap screws 20. Air pressure input opening 21 is provided adjacent the inward end of wall 10 within which opening is mounted fitting 22.

Welded or otherwise securely attached or integral to interwall 11 is the side wall 23 of the pressure half of a service brake chamber 24, same having pressure inlet opening 25 communicating therewith with fitting 26 mounted therein. The inward flange 27 of wall 23 receives conventional flexible diaphragm 28 in engagement thereagainst. The other half of the service chamber side wall is designated 29 and has diaphragm abutting flange 30, inwardly extending inner wall portion 31 with terminal flange 32 thereon and breather hole 33 therethrough. Piston rod 34 has pad 35 rigidly connected to the outer end thereof, the latter abutting in conventional manner against the inward side of diaphragm 28. Diaphragm return spring 36 acts between wall 31 and pad 35. Ring 37 engages flanges 27 and 30 of service chamber wall portions 23 and 29 and the periphery of the diaphragm 28 therebetween. Hollow cylinder 38 encircles piston rod 34, the latter connecting to the vehicle brake mechanism in conventional fashion through cam or wedge type operating mechanism.

Returning to the emergency or safety brake chamber generally designated 39 and defined within walls 10, 11 and 14, piston or push rod 40 is slidably received within opening 12 by fitting or bearing 41 having sealing means 42 therein. Plate 43 is connected to the inward end of push rod 40 by screw 44 and abuts the side of diaphragm 28 opposite that of pad 35 on piston rod 34.

The opposite end of push rod 40 has enlarged flange or ring 45 thereon. Slidably encircling the shaft of push rod 40 is piston hub or sleeve 46, the latter having outwardly extending flange 47 on the inward end thereof, opening 48 therethrough, externally threaded portion 49 thereof and step or groove 50 in the outer central portion thereof adapted to seat flange 45 of push rod 40. Hub 46 and flange 47 are fixed to or integral with piston 57.

Peripheral to or concentric of hub 46 is cylindrical release tube 51 having sealing cap 52 welded integral or otherwise fixedly attached thereto with inwardly extending stud or protrusion 53 adapted to abut the outer central surface of the end of push rod 40 and nut 54 fixedly attached to or integral with the outer central surface thereof. Tube 51 additionally has lesser inner diameter inward portion 55, same internally threaded, said portion 55 adapted to threadably engage hub thread 49. The lower center portion of cylinder 51 is beveled or counterbored as at 56.

Piston 57 has outwardly extending circumferential wall portion 58 having circumferential slots or grooves formed therein to receive oil ring 59 and seal 60 whereby to pressure seal against the inside surface of wall 10. The peripheral inward portion of piston 57 is beveled as at 61. Piston center portion 62 is indented outwardly whereby to overlie bearing or fitting 41 and interwall portion 13 as seen in FIG. 2 and has a stepped opening 63 centrally therethrough to receive in connected or fixed fashion the lower end of sleeve 46. Sleeve or hub 46, as noted, moves at all times in concert with piston 57. A seal 64 encircles the outer right angle juncture of piston 57 and hub 46 centrally thereof and underlies bevel or counterbore 56 of tube 51 when tube 51 is in the screwed down position seen in FIG. 1 of the drawings.

Any suitable power spring 65 abutting between wall 14 and piston 57 is employed in the usual manner of a spring safety brake. Collar 66 is employed between the outer surface of cylinder 51 and the inner edge of flange 17 at opening 18.

As previously mentioned, the basic spring brake cylinder chamber 39 and the pressure half of the service brake chamber 24 have a common interwall 11 with sealing means 42 in fitting 41 to prevent fluid under pressure from passing from one chamber to the other. Each chamber has a flow fitting 22 or 26 for introducing fluid under pressure. Removable cylinder head and spring support 14, is retained with respect to sidewall 10 with numerous self-locking cap screws 20, or other suitable means. The central tubular portion 16 of same has a reduced diameter flange 17 serving to hold collar 66 and to come in contact with flange 52 on tube 51 whereby to prevent separation of the removable cylinder head and spring support 14, and piston 57 when removing same from the cylinder. Head 14 is not required to provide guidance to flange 52 in reciprocatory in and out motion thereof due to the length of the cup-shaped outer piston wall 58 on piston 57.

The basic design of piston 57, including sleeve or hub 46, comprises a cup-shaped piston having a dished center portion with an extended tubular hub, the latter having external threads for means of securing and preventing movement of push rod 40 during normal operation of the unit. The cup-shaped integral piston, with its dished center portion is made of a light weight alloy material and the extended tubular hub is made of a harder material. The bore in said tubular hub or sleeve 46 is such that it supports the push rod 40 to permit proper alignment with sealed means in the cylinder 10. The cupped portion 58 of piston 57 is made of sufficient length to permit the installation of oil ring 59 and seal 60. The latter retain a lubricating agent between them so that, during the piston's reciprocating motion, the internal wall of the cylinder 10 is continuously lubricated. Furthermore, said cup portion provides sufficient stability to prevent piston cocking during its forward motion.

Release tube or cylinder 51 is composed of a tubular section closed on one end with a plate or flange 52 having an extended shoulder to serve the purpose of contacting collar 66 held by the reduced diameter portion 17 of the tubular portion of the cylinder head and spring support 14. This contact will only occur when the chamber 14 is removed to permit servicing of the seals on pistons 57 and 42. The central inner portion or stud 53 on plate or closure 52 contacts the outer end of push rod 40 to securely hold it in place. The open end of cylinder 51 is counterbored or beveled as at 56 to accept sealing means 64 between it and the piston upper surface and is also internally threaded as at 55 for a short distance to permit its attachment to the tubular hub or sleeve 46 of piston 57. Seal means 64 is nonmovable. It (in concert with portion 55) prevents escape of fluid under pressure from chamber 39 along push rod 40 and retains fluid under pressure within chamber 39.

Referring to the drawings, and taking up the operation of the device, attention is first directed to FIG. 1. In normal operation of the device, air pressure introduced into the spring brake air inlet 22 (when back-off tube or cylinder 51 is screwed down against the piston outer surface tightly enclosing seal means 64 and sealing off opening 48) will cause piston 57 to compress main spring 65. Piston hub 46 and back-off tube 51 move therewith whereby nut 54 protrudes from the cavity of wall portion 16 of the housing. In the course or if fluid pressure should fall therein below a sufficient amount to counter spring 65, piston 57, under impetus of spring 65, moves toward the interwall 11. The piston action is transmitted through hub 46 into back-off tube 51 and thence through stud or protrusion 53 to shaft 40. From shaft 40 same passes through interwall 11 to pad 43 then to diaphragm 28, which then transfers action to pad 35 and shaft or rod 34 to the brake assembly and brake applied position. With back-off tube 51 remaining tightly threaded down against the outer face of piston 57 in zone 62 thereof, the return of air pressure to the space 39 through inlet 22 will serve to return piston 57 to the position of FIG. 1.

When spring 65 has expanded to force piston 57 toward the interwall 11 to brake applied position, but not as shown in FIG. 2, a full or partial release of the spring force on the brake mechanism may be achieved by backing off tube 51 on hub 46, utilizing nut 54. Thus, to relieve the action of spring 65 against the brake mechanism, back-off tube 51 is turned in a counterclockwise direction, whereby tube 51 moves longitudinally along hub 46 as seen in FIG. 2. This permits shaft 40 with pad 43 to move to the right in the view of FIG. 2, under the action of return spring 36, thus relieving pressure against the brake assembly to the degree that tube 51 is backed off on hub 46. When flange 45 again abuts stud 53, such action is terminated. Full release is obtained by full back off of tube 51 on hub 46. Partial relief or release of the spring action is obtained by partial back off.

It should also be noted that further action may be taken from the position of FIG. 1. If nut 54 and back-off tube 51 are turned in a counterclockwise direction from the position of FIG. 1, with spring 65 compressed by air pressure operated through inlet 22, the air pressure in cavity 39 against the inner surface of piston 57 is relieved along the length of shaft 40 out opening 48 past seal means 64 and out bleed opening 19 whereby spring 65 will exert sufficient force to move piston 57 toward interwall 11 to brake applied position. This action takes place immediately following the beginning of back off of tube 51 from the outer surface of piston portion 62 and as air pressure is lowered in chamber 39. The back-off tube 51 and its action on shaft 40 follows piston 57 as it is moved forwardly or inwardly under the action of spring 65. Further counterclockwise rotation of nut 54 and tube 51 attached thereto moves tube 51 outwardly relative hub 46 in the manner seen in FIG. 2. The height of piston cup portion 58 relative to piston portion 57, the length of wall 10 from interwall 11 to the inner edge of flange 15, the length of shaft 40, the length of sleeve 41 and the length of back-off tube 51 to stud 53 are all regulated so that, when back-off tube 51 is unthreaded in counterclockwise direction fully on hub 46 (that is, opposite to the position shown in FIG. 1, with piston portion 57 abutting interwall 11, and flange 43 on the end of shaft 40 not abutting interwall portion 13) flange 45 will not abut stud 53 on the inner surface of flange 52.

When the pressure in chamber 39 has been relieved entirely through fitting 22 with tube 51 in the sealing position of FIG. 1, to relieve the action of spring 65 against piston 57, back-off tube 51 should be turned in a counterclockwise direction. This allows, as previously noted, shaft 40 to move outwardly against stud 53, to the extent tube 51 is backed off.

To reactivate the spring action, tube 51 is turned in a clockwise direction until same contacts piston portion 62 with the inward edge of counterbored portion 56. Spring 65 in the safety chamber cannot be compressed unless tube 51 is fully engaging piston portion 62. If portion 55 of tube 51 is not tightly compressed against piston portion 62, seal means 64 will not prevent air from passing along shaft 40 through port 48 and to atmosphere. Air pressure will be lost from chamber 39.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In combination, an open-ended cylinder,
one end of said cylinder closed by an interwall member having a central opening therethrough, the other end of said cylinder closed by an outer wall member also having a central opening therethrough,
a piston slidably fitting said cylinder with one side thereof facing the outer wall member of said cylinder,
coiled compression spring means seating between said piston side and cylinder outer wall member,
said cylinder outer wall member vented to afford piston movement,
a piston rod relatively movably received at one end on said piston and having a sliding fit through the interwall member central opening,
a hollow externally threaded sleeve centrally connected to said piston and extending outwardly thereof,
said piston rod centrally positioned of said sleeve and penetrating the center portion of said piston,
the outer end of said piston rod of greater diameter than the inner diameter of said hollow sleeve whereby to limit inward motion of the piston rod relative to said sleeve,
a fluid flow passage through the wall of said sleeve adjacent said piston providing fluid communication between opposite sides of said piston,
a back-off tube with a sealed outer end and specified internal diameter concentric to said sleeve and having an inward lesser internal diameter internally threaded portion, the latter threadably engaged with the sleeve externally threaded portion, said tube in one position closing off said fluid passage,
and means for introducing fluid under pressure to said cylinder adjacent the interwall of said cylinder for normally holding the piston in the region of the outer wall member thereby to hold said coiled compression means under compression.

2. A device as in claim 1 including the inner end of the back-off tube counterbored and circumferential sealing means positioned around the sleeve-piston outer surface juncture for engagement with said tube inner end.

3. A device as in claim 1 including the outer wall member of the cylinder centrally dished.

4. Brake actuating mechanism comprising
a closed housing having inner and outer end walls,
a flexible diaphragm within said housing and peripherally secured in place,
means for introducing fluid under pressure to said housing adjacent the outer end wall thereof and at one side of said diaphragm,
a brake operating rod on the other side of said diaphragm and axially arranged relative thereto,
said rod projecting through the inner end wall of said housing for reciprocatory movements,
a disc-like pad on the outer end of said brake rod,
an auxiliary cylinder at one end of said housing and having an outer end wall, the outer end wall of said housing constituting also the inner end wall of said cylinder,
a piston slidably fitting said cylinder with one side thereof facing the outer end wall of said cylinder,
coiled compression spring means seating between the piston and outer cylinder end wall,
said outer cylinder end wall vented to permit piston reciprocation,
a piston rod relatively movably received at one end on said piston and having a sliding fit in the common wall for said housing and cylinder,
a plate on the inner end of said piston rod, same disposed within said housing and bearing against the central portion of said diaphragm,
means for introducing fluid under pressure to said cylinder adjacent said common wall for normally holding the piston in the region of the outer end wall of the cylinder thereby to hold said coiled compression means under compression,
a hollow externally threaded sleeve centrally connected to said piston and extending outwardly thereof,
said piston rod positioned centrally of said sleeve and penetrating said piston center portion,
the outer end of said piston rod of greater diameter than the internal diameter of said sleeve hollow center whereby to limit inward motion of piston rod relative to said sleeve,
a fluid flow passage through the wall of said sleeve adjacent said piston providing fluid communication between opposite sides of said piston, and a back-off tube with a sealed outer end and specified internal diameter concentric to said sleeve having an inward lesser internal diameter internally threaded portion, the latter threadably engaged with the sleeve, said tube in one position closing off said fluid flow passage.

5. A device as in claim 4 including the inner end of the back-off tube counterbored and circumferential sealing means positioned around the sleeve-piston outer surface juncture for engagement with said tube inner end.

6. A device as in claim 4 including the outer end wall of the cylinder centrally dished inwardly.

References Cited

UNITED STATES PATENTS

| | | | |
|---|---|---|---|
| 3,107,583 | 10/1963 | Woodward | 92—63 |
| 3,179,019 | 4/1965 | Cruse | 92—63 X |
| 3,218,939 | 11/1965 | Cruse | 92—63 |
| 3,293,995 | 12/1966 | Smith | 92—110 |

CARLTON R. CROYLE, *Primary Examiner.*

MARTIN P. SCHWADRON, *Examiner.*

I. C. COHEN, *Assistant Examiner.*